United States Patent
Nagano

[11] Patent Number: 6,112,717
[45] Date of Patent: Sep. 5, 2000

[54] ENGINE CYLINDER SYSTEM

[76] Inventor: Shigeru Nagano, 44-149 Nakasaigo, Gifu-shi, Japan

[21] Appl. No.: 09/188,737

[22] Filed: Nov. 9, 1998

[30] Foreign Application Priority Data

Nov. 25, 1997 [JP] Japan ..................................... 9-340646

[51] Int. Cl.[7] .................................................. F02B 31/08
[52] U.S. Cl. ........................................... 123/308; 123/301
[58] Field of Search ..................................... 123/308, 432, 123/302, 336, 337, 184.56, 301; 251/212

[56] References Cited

U.S. PATENT DOCUMENTS

| | | | |
|---|---|---|---|
| 1,595,300 | 8/1926 | Halloran .................................. | 251/212 |
| 2,037,663 | 4/1936 | Lalor ....................................... | 251/212 |
| 4,538,574 | 9/1985 | Lombardi ............................... | 123/432 |
| 4,635,592 | 1/1987 | Weichsler ............................... | 123/308 |
| 5,065,711 | 11/1991 | Lesley .................................... | 123/308 |
| 5,335,635 | 8/1994 | Kadoi et al. ............................ | 123/302 |

*Primary Examiner*—Andrew M. Dolinar
*Attorney, Agent, or Firm*—Adams, Schwartz & Evans, P.A.

[57] ABSTRACT

An engine cylinder system (1) is disclosed. The system (1) is comprised of at least one cylinder (2) capped with a cylinder head (4), combustion chamber (7), and piston (25). The cylinder head (4) is provided with inlet passages (11, 12) and exhaust passages (29, 30) in fluid communication with the combustion chamber (7) via openings (22, 23, 31, 32). The openings (22, 23) are provided on the head (4) diametrically opposite such that inlet gases (35, 36) can generate powerful turbulence within the chamber (7).

4 Claims, 6 Drawing Sheets

ENGINE CYLINDER SYSTEM

BACKGROUND OF THE INVENTION

1. Field of the Invention

This invention generally relates to an engine. More particularly, this invention relates to an engine cylinder system where both distribution of fuel-air mixture in a combustion chamber and expelling of combusted gas from the combustion chamber are significantly improved.

2. Background Art

An internal combustion engine generally includes a cylinder or a cylinder block having a plurality of cylinders. It is known that highly turbulent or "instantly and evenly" distributed fuel-air mixture in the combustion chamber provides excellent engine performance including improved fuel consumption, power output and purification of exhausts.

A "lean-burn" combustion engine system is known, which burns "lean mixture." This lean-burn engine system consumes less fuel and thus can be more economical than a conventional gasoline engine system. The lean-burn engine system can lower contents of harmful carbon monoxide in exhausts. Lowering of nitric oxides can also be expected. However, ignition and burning of lean mixture at present is not as reliable as in the case with a conventional engine. One solution to this problem and other problems that the lean-burn system intrinsically possesses is "enhanced circulation" of fuel-air mixture within the combustion chamber so that the fuel-air mixture can be distributed within the combustion chamber "instantly" and "evenly."

FIG. 10 schematically shows a top view of a conventional engine cylinder 50 having a combustion chamber 51 to which a pair of inlet passages 52 and 53 are connected on the "same" side in fluid communication to feed fuel-air mixtures 56 and 57 into the combustion chamber 51. The inlet openings of the passages 52 and 53 open along the circumference of the cylinder 50 in an attempt to enhance the circulation of the fuel-air mixture. Similarly, a pair of exhaust passages 54 are connected to the combustion chamber 51 on the "same" opposite side in fluid communication to expel combusted gases from the combustion chamber 51.

It is noted that fuel may be premixed with air before entering the combustion chamber 51 (premixed fuel type), or may be injected directly into the combustion chamber 51 and mixed with air in the combustion chamber 51 (direct fuel injection type).

One of the inlet passages, passage 53 in this case, is internally provided with a fuel-air mixture control valve 55, generally a butterfly valve, which closes the passage 53 under control as shown in FIG. 9 for a low combustion load operation mode in order to restrain the gas flow 57, causing swirling 58 in the combustion chamber 51 as will be appreciated by a person skilled in the relevant art. This swirling 58 of the fuel-air gas flow 58 can improve combustion of the "thin" fuel-air mixture 56 in the chamber 51 partially through enhancement of the combustion velocity which shortens the combustion time, enhancing overall engine performance including purification of exhaust.

One important disadvantage of this conventional arrangement of the inlet and exhaust passages is that when such a butterfly valve 55 is fully open as shown in FIG. 10 for a high combustion load operation mode, the flow rates of the inlet gases 56 and 57 become substantially equal, which hinders swirling of the gases 56 and 57 in the combustion chamber 51, for the reverse directional flows of the gases 56 and 57 substantially interfere with each other in the combustion chamber 51, slowing and disrupting the distribution of the fuel-air mixtures 56 and 57 in the combustion chamber 51, as will be understood by a person skilled in the art. As a result, the combustion of the fuel in the combustion chamber 51 falls short of desired performance, resulting in less power output and more impurities than desired.

Another important disadvantage of not only this passage arrangement but also a single inlet, single exhaust passage type is that fuel-air mixture (premixed) or air (direct injection) is sucked into the combustion chamber from "one" side only and combusted gas is also expelled from "one" side only of the combustion chamber. As will be understood by a person skilled in the art, "the other" side of the combustion chamber is "far", and the farthest area in the combustion chamber will neither be "instantly" filled with fuel gas (fuel-air mixture) nor be "instantly" evacuated of combusted gas. As a result, the incoming gas and certain amount of outgoing gas will "coexist" in the combustion chamber, somehow deteriorating the burning performance in the combustion chamber.

SUMMARY OF THE INVENTION

Accordingly, it is an object of the present invention to provide powerful turbulence of fuel-air mixture in a combustion chamber irrespective of the operation mode of an engine.

It is another object of the present invention to "instantly" and "evenly" distribute fuel gas in a combustion chamber.

It is another object of the present invention to "instantly" expel substantially all combusted gas from a combustion chamber.

It is another object of the present invention to improve the combustion performance of an engine so as to provide higher engine power per unit fuel.

It is another object of the present invention to improve purity of exhaust gases.

It is another object of the present invention to provide an engine cylinder system having two laterally extending air inlet passages having inlet openings and two laterally extending exhaust passages having exhaust openings.

Other objects of the present invention will be readily appreciated from the following descriptions.

For clarity and convenience of describing the present invention, a single-cylinder system is sometimes referred to hereunder. It is to be understood that any desired number of cylinders can be incorporated as a cylinder block. It is also "premixed fuel type" and "direct fuel injection type" engines of practically all kinds of internal combustion engine systems, including diesel engines.

A combustion chamber is provided between a cylinder head capped on a cylinder and a piston head as is known in the art. Two inlet passages are mounted on the cylinder head, "diametrically" opposite to each other or symmetrically from the center of the cylinder head, in fluid communication with the combustion chamber. Advantageously, they open into the combustion chamber in the same circumferential direction substantially along the circular inner wall of the cylinder such that the inlet gases from the passages generate "swirling" within the chamber "in cooperation." In addition, the inlet openings of the passages are provided aslant downward such that the inlet gases also generate downward "tumbling." These swirling and tumbling of both gases provide a unified and promoted "turbulence" (combination of swirling and tumbling) within the combustion chamber as the inlet gas flows do not hinder each other unlike the conventional arrangement (high combustion load operation mode), as will be appreciated by a person skilled in the art.

Another important advantageous feature of this invention is that the "most distant" point within the combustion chamber from either inlet opening is substantially "shorter" than the case with the conventional arrangement, for the inlet openings of the present invention are arranged diametrically opposite, and not on the same side, which substantially assists "instant and even" distribution of the fuel-air mixture in the combustion chamber.

As the distribution within the combustion chamber of the fuel-air mixture is enhanced as such, the ignition and burning of the mixture is enhanced and becomes very reliable, providing improved engine performance over a conventional engine system.

The cylinder is also provided with discharge passages in fluid communication with the combustion chamber, again diametrically opposite to each other, each between the first and second inlet passages such that the discharge passages can efficiently expel the combusted gas, which is now cleaner or more thoroughly combusted than the case with a conventional engine cylinder system.

It can be readily appreciated that the "combusted gas" can be expelled from the combustion chamber more efficiently and quickly because, again, the most distant point within the combustion chamber from either discharge opening is substantially shorter than the case with the conventional arrangement. This feature is important to efficiently avoid undesirable mixing of incoming "fresh" fuel-air mixture and what remains of outgoing "exhaust" in the combustion chamber, which further improves "engine performance."

Optionally, each inlet passage may be furnished internally with an annular flow control valve to control the flow of the inlet gas. The annular control valve is advantageously a camera diaphragm type so that the inlet gas flows along the central axis of the inlet passage, where it can gain speed without suffering loss from contacting the inner wall of the inlet passage.

Optionally, the piston head top may be provided with a circular dint as part of the combustion chamber for a direct fuel injection type engine. In this arrangement, the fuel gas in the combustion chamber can be concentrated around the spark plug, the feature being particularly advantageous for lean-burn engines.

The advantageous features of the present invention can be more thoroughly appreciated from the following detailed description of the non-restricting embodiments of the present invention when read with the accompanying drawings.

DETAILED DESCRIPTION OF PREFERRED EMBODIMENT

Figure 1:
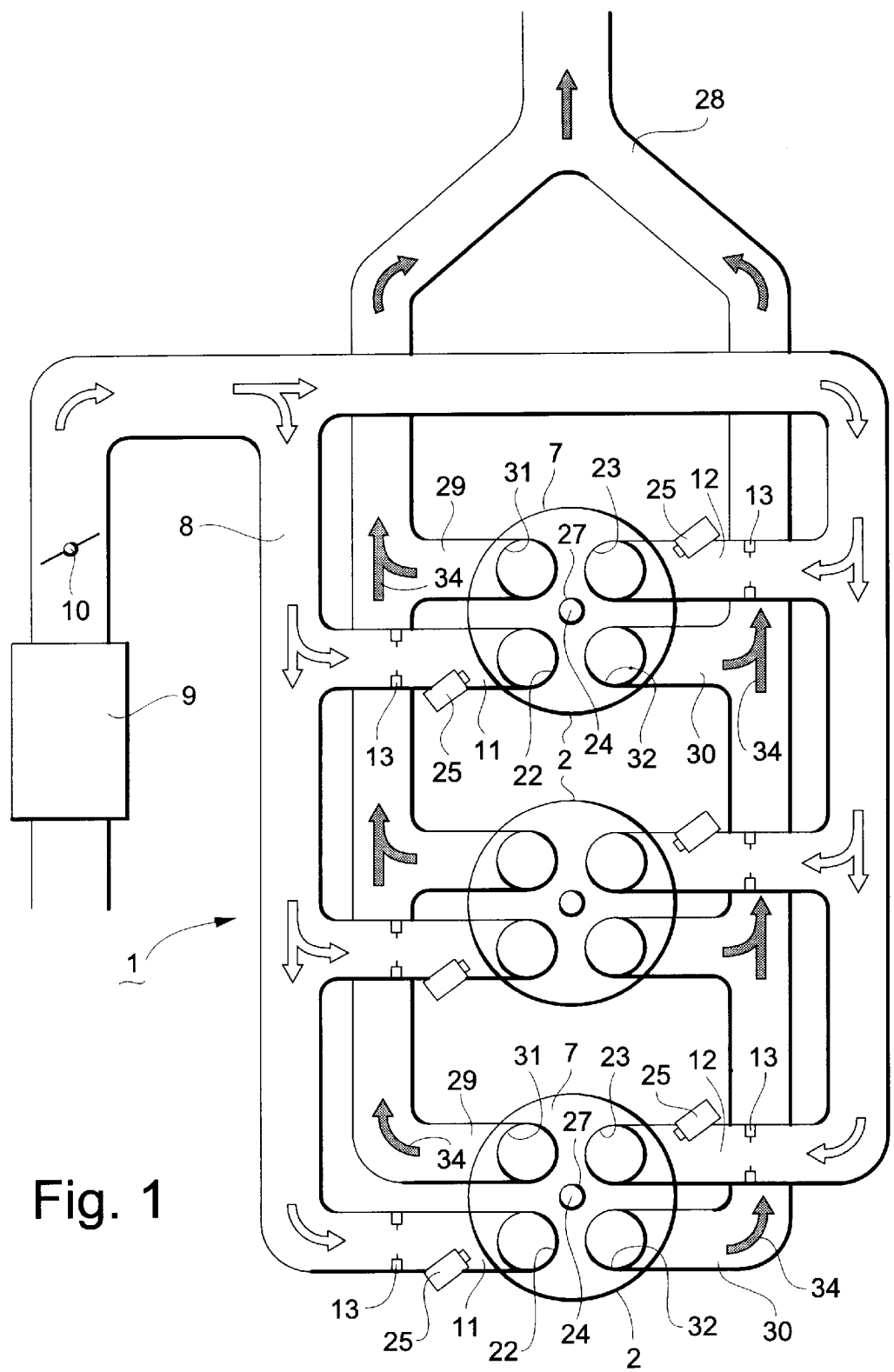
FIG. 1 is a schematic top view partially showing an arrangement of a cylinder block according to an embodiment of the present invention.
Figure 2:
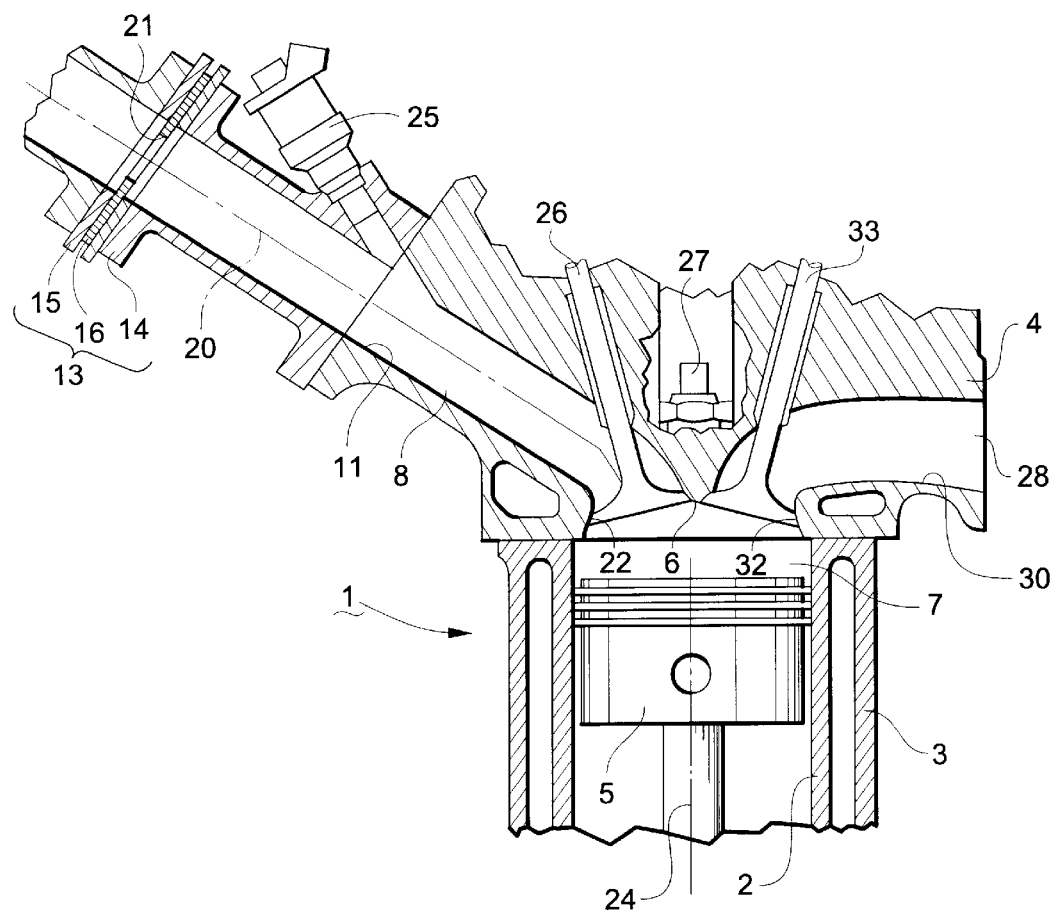
FIG. 2 is a schematic sectional view partially showing a cylinder system according to an embodiment of the present invention.

In FIG. 1 is shown a cylinder block or system 1 which is comprised of three cylinders 2. Each cylinder 2 is capped with a cylinder head 4 as shown in FIG. 2. The cylinder 2 is provided with a piston 5. The space within the cylinder 2 between the cylinder head 4 and the piston head 5 is a combustion chamber 7.

The cylinder block 1 also includes an inlet passage arrangement 8 and exhaust passage arrangement 28 both of which are branched as shown in FIG. 1.

The inlet passage arrangement 8 incorporates an air-cleaner 9 along its main passage and a throttle valve 10 downstream from the air-cleaner 9. Each cylinder head 4 receives two laterally-extending inlet branch passages 11 and 12 and two laterally-extending exhaust branch passages 29 and 30, which are connected to the combustion chamber 7 in fluid communication through their openings 22, 23, 31 and 32, respectively. The inlet openings 22 and 23 of the inlet branch passages 11 and 12 are provided on the cylinder head 4 diametrically opposite to each other. The exhaust openings 31 and 32 of the exhaust branch passages 29 and 30 are also provided on the cylinder head 4 diametrically opposite to each other, each between or flanked by the inlet openings 22 and 23.

Each of the inlet branch passages 11 and 12 is provided internally with an annular flow control valve 13 immediately upstream to the cylinder head 4.

Figure 3:
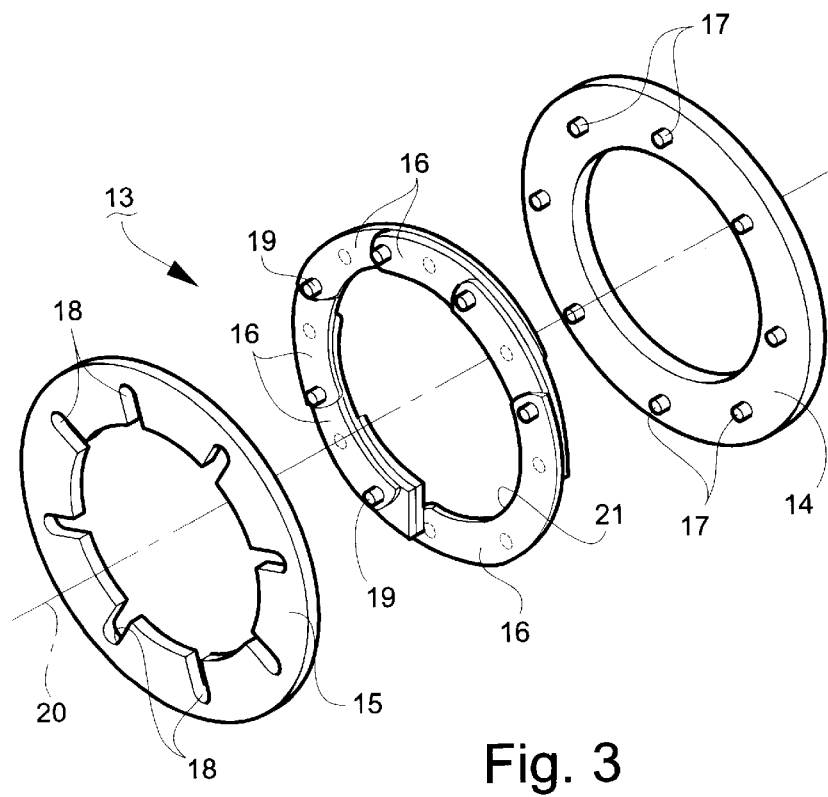
FIG. 3 is an exploded view of an annular flow control valve according to the present invention.

As shown in FIGS. 3 and 4, the annular flow control valve 13 is similar to an iris diaphragm, consisting of a stationary base ring 14 and a turn ring 15 with a plurality of arc plates 16 sandwiched therebetween. The arc plates 16 are arranged into a ring shape as shown in FIG. 3.

The base ring 14 is provided with evenly distributed first engagement protrusions 17 whose number matches the number of the arc plates 16 having as many receptacle recesses (broken lines) distributed evenly. The first engagement protrusions 17 correspondingly engage these receptacle recesses and loosely hold the arc plates 16.

Each arc plate 16 also has a second engagement protrusion 19. The turn ring 15 has radially and evenly provided receptacle slots 18 whose number equals to the number of the second engagement protrusions 19. The second protrusions 19 correspondingly engage the receptacle slots 18 and can slide freely within the slots 18.

Figures 4A, 4B:
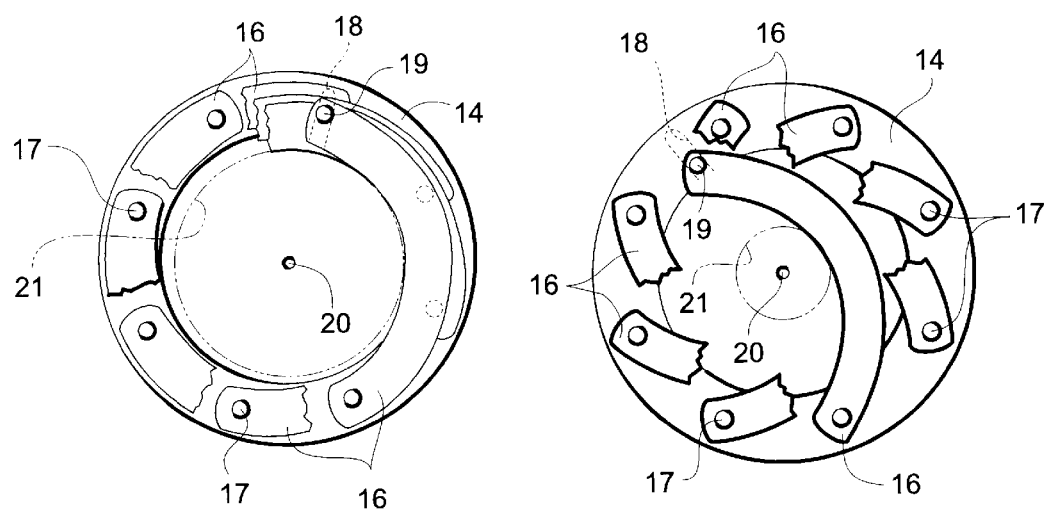
FIG. 4(a) schematically shows the annular flow control valve of FIG. 3 when it is fully "open"
FIG. 4(b) schematically shows the annular flow control valve when it is fully "closed"

As will be appreciated by a person skilled in the art, the annular flow control valve 13 can be conventionally energized and can provide a valve function as shown in FIG. 4 by controlled turning of the turn ring 15, where FIG. 4(a) shows its fully open state for a high combustion load operation and FIG. 4(b) shows its "fully" closed state for a low combustion load operation.

When the control valve 13 is in a "closed" state such as shown in FIG. 4(b), there is provided a circular opening 21 around the axis 20 of the inlet branch passage 11 (12). The speed of the inlet gas can then be magnified when the inlet gas flows through the opening 21 as the flow does not contact the inner wall of the passage 11, which would otherwise slow down the speed.

An advantageous feature provided through use of the control valve 13 in the inlet passage 11 immediately upstream to the combustion chamber 7 is that the flow velocity of the inlet gas can be amplified, which can promote turbulence of the fuel-air mixture within the combustion chamber 7.

Another advantage is that both inlet passages 11 and 12 are always "open", and the combustion chamber 7 always receives dual gas streams 35 and 36 to provide advantages of the present invention.

Figure 5:
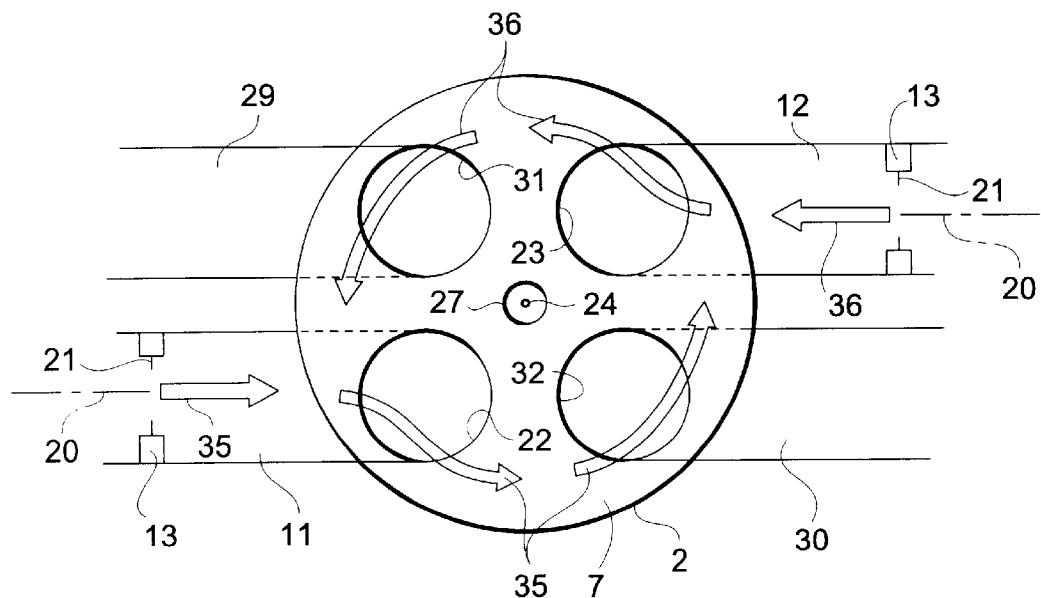
FIG. 5 schematically shows the flows of the incoming gases.
Figure 6:
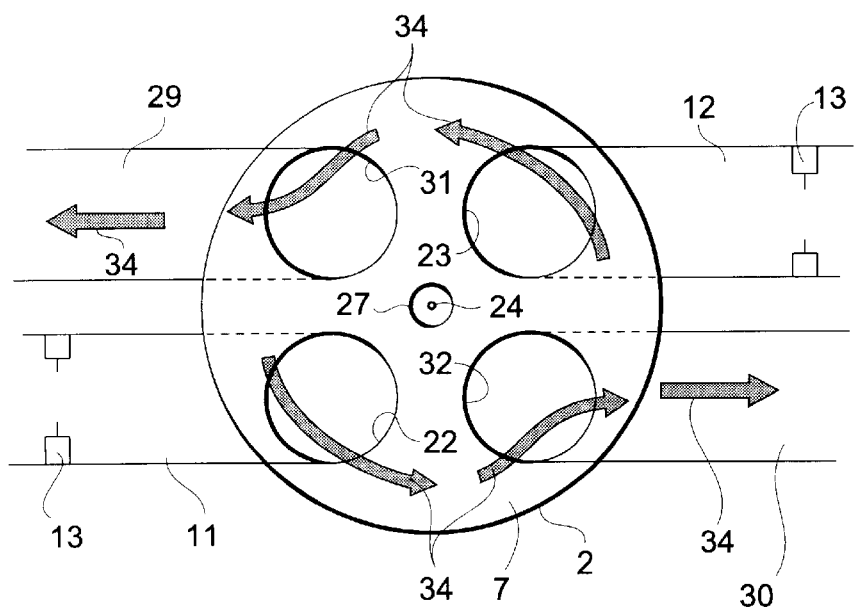
FIG. 6 schematically shows the flows of the outgoing gases.

As explained, the inlet openings 22 and 23 of the inlet passages 11 and 12 are provided in communication with the combustion chamber 7 as schematically shown in FIGS. 5 and 6 diametrically oppositely such that the inlet gases 35 and 36 enter the combustion chamber 7 from their respective inlet openings 22 and 23 substantially along the inner wall of the chamber 7 in the same circumferential direction (swirling), counterclockwise in this case, as well as toward the head of the piston 5 (tumbling) as partially shown in FIG. 2. The inlet openings 22 and 23 are each provided with an inlet valve means 26 which opens and closes the openings 22 and 23 in response to the reciprocal movement of the piston 5. In this arrangement of the inlet openings 22 and 23, the incoming gases 35 and 36 do not interfere with each other as shown in FIG. 5. As a result, the incoming gases 35 and 36 are "unified" in the combustion chamber 7 into a powerful "turbulence."

In this embodiment, each of the inlet passages 11 and 12 is additionally provided with a fuel injector 25 downstream from the annular flow control valve 13 as showing in FIG. 2 to prepare fuel-air mixture. The cylinder head 4 has an ignition means or spark plug 27.

The openings 31 and 32 of the exhaust passages 29 and 30 are arranged on the combustion chamber 7, advantageously in the identical manner with the inlet openings 22 and 23. The openings 31 and 32 are each flanked by the inlet openings 22 and 23, and capped with an exhaust valve device 33 as shown in FIG. 2.

Figure 7:
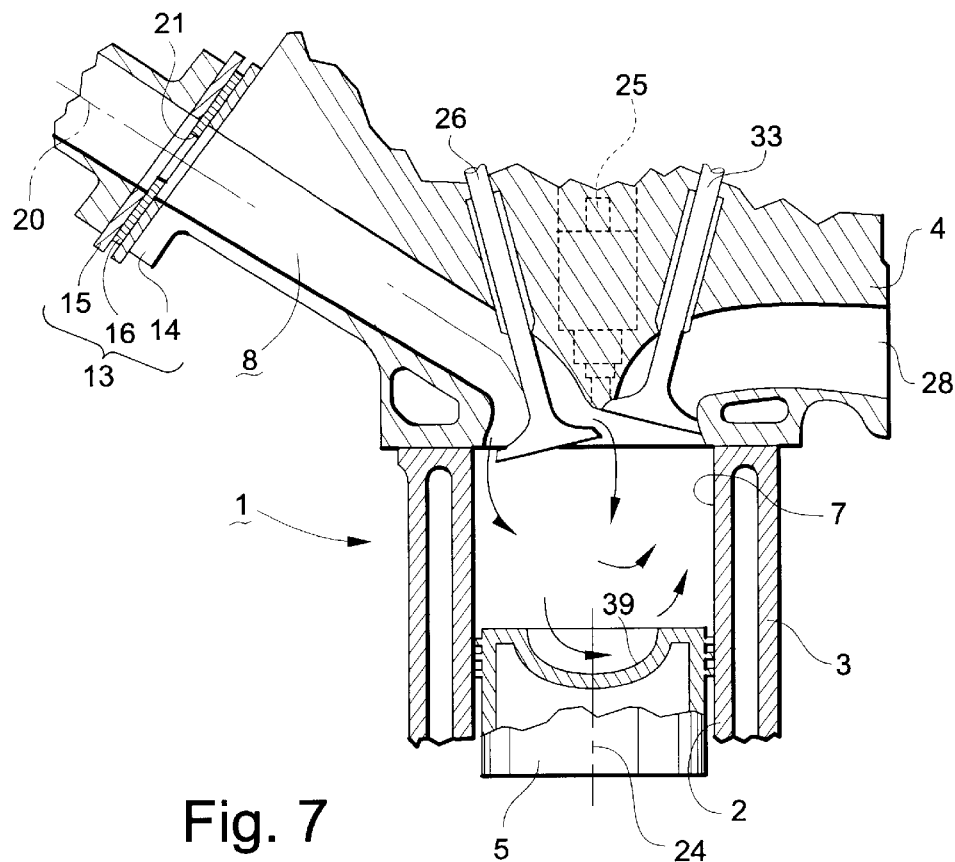
FIG. 7 is a sectional view showing another embodiment of the present invention.
Figure 8:
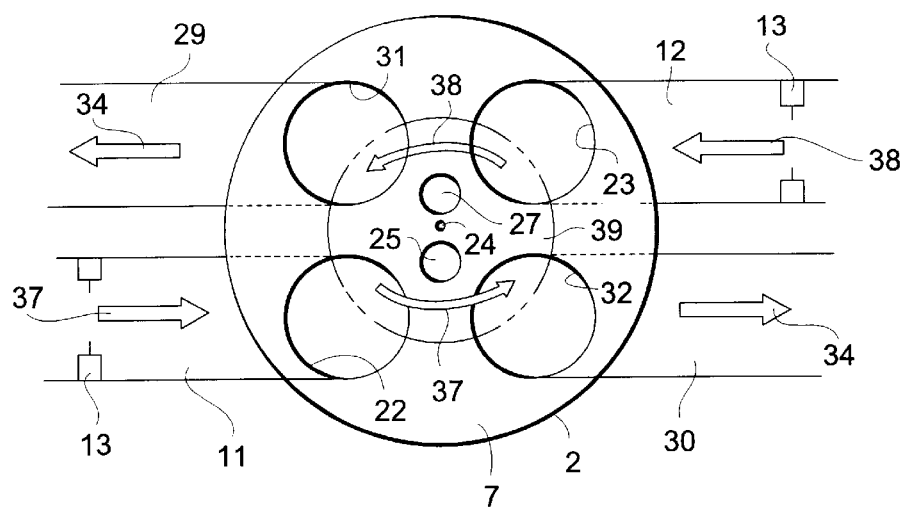
FIG. 8 shows the flows of the incoming and outgoing gases of the embodiment of FIG. 7.
Figure 9:
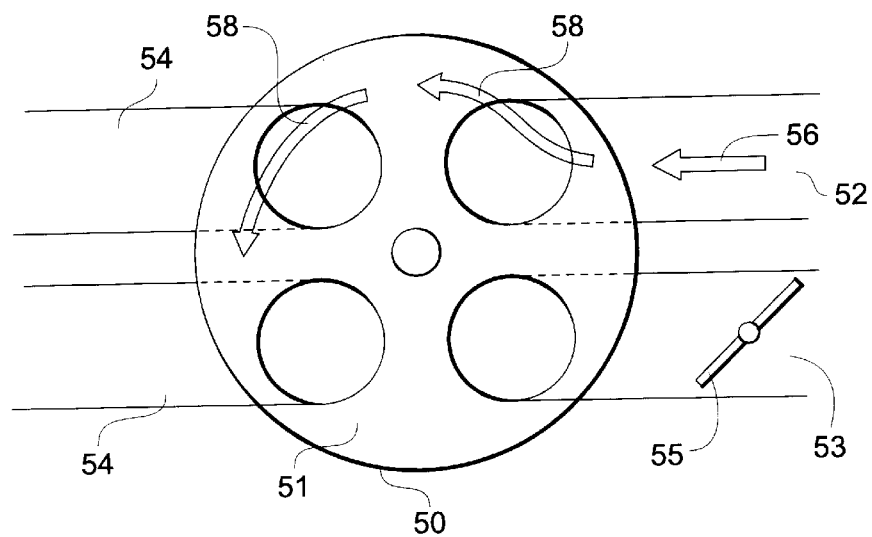
FIG. 9 shows a conventional flow of an incoming gas under a low combustion load operation mode.
Figure 10:
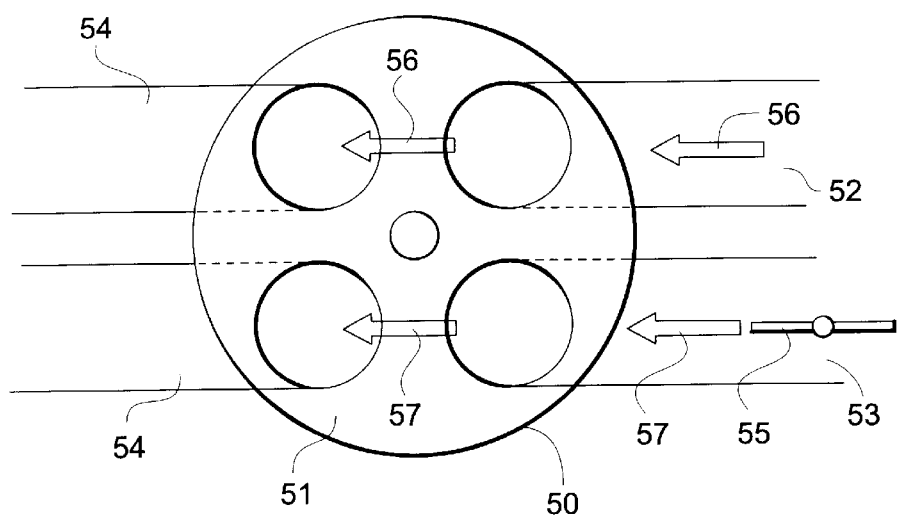
FIG. 10 shows conventional flows of incoming gases under a high combustion load operation mode.

There is shown another embodiment of the present invention in FIGS. 7 and 8, where the piston head 5 is additionally provided with a circular dent 39. It is noted that the fuel injector 25 is provided in the cylinder head 4 so that fuel is directly injected into the combustion chamber 7 and mixed with the gases (air) 37 and 38 entering the combustion chamber 7 respectively from the inlet passages 11 and 12 through the inlet openings 22 and 23.

The fuel-air mixture (37, 38) in the circular dent 39 is powerfully turbulent when it is ignited with the spark plug 25, providing an improved engine performance over a conventional engine system incorporating such or similar dents without the arrangement of the present invention.

The above embodiments should not be taken as limiting the scope of the present invention. All the features of the embodiments are provided here just for the purposes of illustrating the present invention. The true scope of the invention is thus given by the following claims.

What is claimed is:

1. An engine cylinder system including at least one cylinder, combustion chamber, cylinder head, a fuel injector, piston having a head, two laterally extending air inlet passages having inlet openings and two laterally extending exhaust passages having exhaust openings, wherein said two inlet openings are provided diametrically oppositely on said cylinder head in fluid communication with said combustion chamber, wherein said inlet passages each diagonally and downwardly converge on the cylinder head to thereby create enhanced swirling and tumbling of gas vapors as air from said inlet openings and fuel from said fuel injector are mixed in said combustion chamber, wherein said exhaust openings are provided diametrically oppositely on said cylinder head in fluid communication with said combustion chamber such that each of said exhaust openings is flanked by said inlet openings, and further wherein each of said inlet passages extends substantially laterally parallel to an adjacent exhaust passage.

2. An engine cylinder system according to claim 1, wherein said inlet openings open into said combustion chamber in the same circumferential direction.

3. An engine cylinder system according to claim 1, wherein each of said inlet passages internally has an annular flow control valve which is capable of controlling the size of its central opening.

4. An engine cylinder system according to claim 1, wherein said head of said piston is provided with a circular dent.

* * * * *